US008719845B2

(12) United States Patent
Augustine et al.

(10) Patent No.: US 8,719,845 B2
(45) Date of Patent: May 6, 2014

(54) SHARING AND SYNCHRONIZATION OF OBJECTS

(75) Inventors: Matthew S. Augustine, Seattle, WA (US); John Burkhardt, Arlington, MA (US); Brian M. Lambert, Redmond, WA (US); Raymond E. Ozzie, Seattle, WA (US); Jason E. Schleifer, Cambridge, MA (US); Richard Z. Speyer, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/782,751

(22) Filed: May 19, 2010

(65) Prior Publication Data

US 2011/0289514 A1 Nov. 24, 2011

(51) Int. Cl.
*G06F 9/44* (2006.01)
*G06F 9/455* (2006.01)

(52) U.S. Cl.
USPC .............................................. 719/316; 718/1

(58) Field of Classification Search
USPC ........................................................ 719/316
See application file for complete search history.

(56) References Cited

U.S. PATENT DOCUMENTS

| 5,862,376 | A | 1/1999 | Steele et al. |
| 6,141,720 | A | 10/2000 | Jeffords et al. |
| 6,247,025 | B1 | 6/2001 | Bacon |
| 7,543,301 | B2 * | 6/2009 | Monnie et al. ............... 719/312 |
| 8,015,561 | B2 * | 9/2011 | Stanev ............................. 718/1 |
| 2004/0172423 | A1 * | 9/2004 | Kaasten et al. ............... 707/201 |
| 2004/0267871 | A1 | 12/2004 | Pratley et al. |
| 2005/0086656 | A1 * | 4/2005 | Whitlock et al. ................ 718/1 |
| 2006/0161516 | A1 | 7/2006 | Clarke et al. |
| 2007/0219999 | A1 | 9/2007 | Richey et al. |
| 2009/0055464 | A1 | 2/2009 | Multer et al. |
| 2009/0138198 | A1 | 5/2009 | Lee et al. |
| 2009/0254601 | A1 | 10/2009 | Moeller et al. |
| 2009/0282043 | A1 | 11/2009 | Dharmavaram et al. |

OTHER PUBLICATIONS

International Search Report and Written Opinion Received of the International Searching Authority for PCT Application No. PCT/US2011/036887, mailed on Dec. 26, 2011, 10 pages.

(Continued)

*Primary Examiner* — Andy Ho
*Assistant Examiner* — Abdou Seye
(74) *Attorney, Agent, or Firm* — Micah Goldsmith; Glen Johnson; Micky Minhas (57) ABSTRACT

Sharing of objects may be implemented in a way that allows programs to use shared objects in much the same way that they would use local objects. In one example, a program creates an object and sets properties through normal instructions that would be used to create a local object. The program then registers the object with a shared object model, which may be maintained by a shared object server. For each machine on which the object may be used, a shared object runtime monitors for changes to the objects, and notifies the server of these changes. The server updates the object, and notifies other machines of changes to the state of the object. The shared object runtimes on those machines receive notification of the changes, and update the local copies.

20 Claims, 5 Drawing Sheets

(56) References Cited

OTHER PUBLICATIONS

"Class SharedObject", Retrieved at << http://dl.fancycode.com/red5/api/org/red5/server/so/SharedObject.html >>, Dated: 2006-2007, 19 pages.

Li, et al., "mSSL: Securely Sharing Data from a Server among Clients", Retrieved at << http://ix.cs.uoregon.edu/~lijun/pubs/papers/li04mssl.pdf >>, In Workshop on Information Security Applications, Aug. 2004, pp. 1-4.

Stoyenko, et al., "Extending Pearl for Industrial Real-Time Applications", Retrieved at << http://ieeexplore.ieee.org//stamp/stamp.jsp?tp=&arnumber=00219619 >>, IEEE Software, vol. 10, No. 4, Jul. 1993, pp. 65-74.

* cited by examiner

SHARING AND SYNCHRONIZATION OF OBJECTS

BACKGROUND

As connectivity of computers and other devices has improved, it has become common for different programs—often running on different computers—to share access to the same information. In the early days of connected computing, units of data were normally transferred between programs and/or machines through specific, operator-directed events. For example, a file of data might be sent from one place to another through e-mail or File Transfer Protocol (FTP). Pipes were an early mechanism that allowed sharing of data between two running programs, but that technique is fairly limited in that it merely allows one running program to send its output to another running program as input. The architecture of modern programs often demands a richer and more sophisticated sharing of data between programs.

While some modern programs are designed to share data with each other, the implementation of data sharing can be relatively complicated from the programmer's perspective. Typically, one of the program's implementers has to write code to perform the various tasks that make data sharing work. For example, the program might include code to listen for incoming data and to send outgoing data. When two programs share data in this manner, the programs generally have to agree on mechanisms for the exchange of data. The nature of the agreed-upon mechanisms are often specific to the type of data that is being shared. For example, if multiple programs want to share graphical information, they typically have to implement a sharing mechanism that takes into account the kind of information that will be exchanged between the programs, the format in which this information will be transmitted, how conflicts among the data will be resolved (e.g., what happens if two of the programs try to update the same data at the same time), and other issues.

Thus, in order for programs to share data, the programs generally have to be implemented with the sharing of data in mind, and normally have to include code that implements the details of data sharing.

SUMMARY

A system of shared objects may be provided that allows programs to create and use shared data objects in much the same way that they would create and use local data objects. A program may contain code to create an object and to set properties on the object. A program may register an object as being a shared object within an object model. Programs that share a common namespace then may access shared objects in the object model. That is, programs may read, write, and modify the shared object. From the perspective of a program (and its programmer), accessing a shared object works like accessing a local object.

The ability to share objects may be implemented, in one example, as follows. An object server may maintain a registry of shared objects. The object server also may maintain a master copy of the shared objects, which represents the "truth" of the objects. Each machine and/or program that uses shared objects may also maintain a local copy of the shared objects that it uses. A shared object runtime on each machine may monitor these local copies to determine what changes have been made. If a change is made, the runtime sends notification of the change to the object server. When the object server receives notification of a change, it updates the truth of the object and then notifies other machines and/or programs so that they can update their local copies of the object.

When a shared object is created, the creator may specify various types of controls on the object, or even on specific properties of the object. For example, an object (or a property of an object) may be subject to a concurrency control that governs how concurrent changes to an object are handled—e.g., last writer wins or optimisitic concurrency wherein if a client updates the object without having had access to the lastest truth, the change will be rejected and the client notified. Or, an object (or a property of an object) may be subject to an access control that governs which machines and/or programs may access the object (or property). Or, an object creator may specify that certain properties of the object are to be shared, and others are not. Or, as another example, an object creator may specify the ability to lock an object for exclusive write permission for a specific period of time.

Use of shared objects is not limited to any particular programming language. In one example, a programming language may allow shared objects to be used in the same way (or approximately the same way) as local objects. Thus, in such an example, a programmer can use a programming language to read, write, modify, add, or delete shared objects in the same way that the programming language allows the programmer to perform those operations on local objects. In this way, the programmer is able to create objects that can be used by other programs or on other machines, without having to implement the details of the sharing mechanism, and without having to write the program in a substantially different way than the program would be written if it used only local objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In modern computing, many programs interact with each other by sharing access to the same set of data. A software package might be built as a set of smaller programs that operate on a common set of data. Or, programs that are otherwise unrelated to each other may want to share data to in order to streamline some part of the user experience. For example, an accounting software package might be built as a set of small programs that perform different accounting functions but operate on a common set of financial data (where the financial data might be distributed across several machines). Or, in another example, an online meeting program that allows distant users to share information in real time might provide a common whiteboard that all users can draw on at the same time. In this case, the content of the whiteboard is, in effect, a set of data (e.g., a set of pen strokes in some sequence) that is shared among instances of the meeting program. Or, a user might run a desktop mail client on a desktop computer and a mobile mail client on a smart phone, and these two mail clients may share access to the same underlying e-mail box. Thus, if the user deletes a message on one client, the delete operation may propagate to the underlying server copy of the e-mail box, and then to other mail clients. There are numerous other examples of programs that interact with each other through data sharing.

While many scenarios exist in which programs share data, the implementations of data sharing are often complex and situation-specific. The notion that the same underlying piece of data can be shared across different programs and/or machines is an abstraction. The mechanisms to put that abstraction into practice are not trivial. For example, when a change is made on one machine, the fact that the change has been made has to be propagated to other machines. There are various different ways that the information can be propagated. The machine on which the change occurs can monitor the data to determine when the data has changed, and can then push the changes out to other machines. Then the other machines can listen for notifications of these changes, and make the changes to their local copies. If different machines change the same piece of data at the same time, rules have to be in place to resolve conflicting changes. In many cases, these mechanisms have to be built into the programs by the authors of these programs. Moreover, the particular ways in which sharing of data is managed may depend on the nature of the data. The sharing mechanisms may be designed to share specific data structures that hold specific types of data. The frequency and/or reliability with which data is shared may be based on the specific nature of the data. In general, programs that want to share data have to be built to manage these issues in some way. Often the mechanisms employed are not re-usable and have to be tailored for each program.

The subject matter described herein provides a general mechanism by which data objects can be shared across machines. The mechanism provided herein allows a program to create a shared object and/or set properties on that object, in much the same manner as if the object were a local object. Sharing mechanisms that are independent of the program itself then manage the mechanics of how that object is to be shared with other programs and/or machines. Conversely, those mechanisms can also provide the program with access to objects that were created by other programs and/or machines, so that the program can use and/or modify those objects. In this way, a shared object model is created that can be used by many programs and/or machines.

The mechanisms described herein allow a program to exercise various levels of control over the objects that it creates. For example, a program can choose whether a particular object (or a particular property of an object) is sharable, or is to be kept local. If the object is to be shared the program can specify which programs and/or machines may use the object or property, and which ones may not. The program may also specify concurrency controls that govern how many programs and/or machines may manipulate an object or property concurrently. (The mechanisms described herein may be used to control the sharing of a property of an object independently of whether the object itself is sharable. This fine-grained control over properties extends not only to whether a particular property can be shared, but also which concurrency and/or access controls apply to the property.)

The mechanisms provided herein may allow programmers to create and use a shared object in much the same way as if the object were purely local. Moreover, use of the mechanisms is not language dependent, and may be used in any language that supports the use of object models. Thus, a program may create an object and set properties in the normal way provided by a particular programming language. The program may then contain an instruction to register the object as a shared object. Registration makes the object part of an object model that is available to any entity that is in the same shared namespace as the creator (unless the program specifies access limitations on the use of the object by specific entities, in which case use of the shared object is restricted to those entities to which use is allowed).

Sharing of object may be managed by a server. The server receives object registrations and maintains the truth of the object model. When changes are made to an object locally, the changes may be communicated to the server, which may then update the truth of the object model, and may communicate the changes to other programs and/or machines that share access to the object. The sharing of the object may be performed in a way that is not dependent on the contents of the object, thereby allowing objects to be shared without regard to the details of what type of data is contained in the object.

Figure 1:
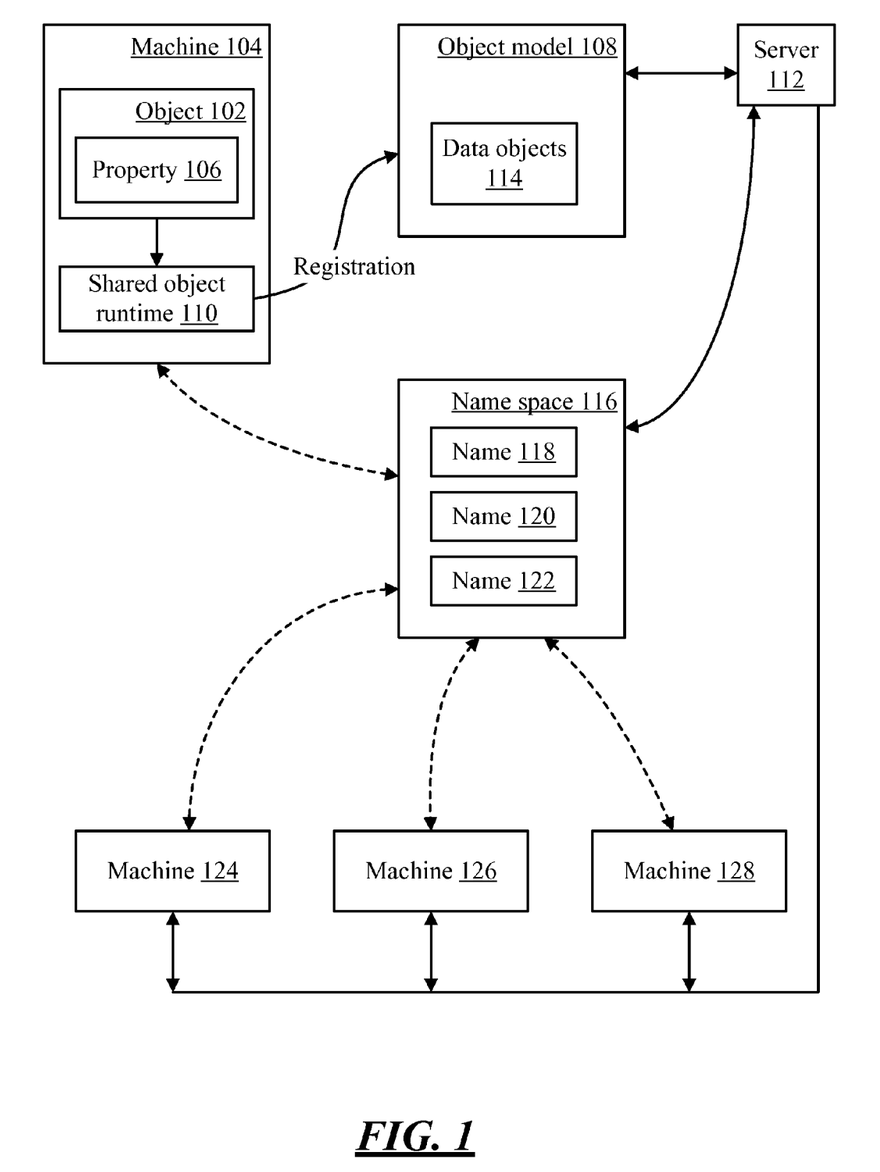
FIG. 1 is a block diagram of an example environment in which sharing of object may occur.

Turning now to the drawings, FIG. 1 shows an example environment in which sharing of object may occur. In the example shown, data object 102 is created on machine 104. Property 106 is set on data object 102. For example, if data object 102 contains data concerning a car, property 106 might contain the make, model, year, or color of the car. Although only one property 106 is shown in FIG. 1, a data object may have any number of properties.

Data object 102 may be created, for example, by a program that executes on machine 104. A data object may be created using any programming language that supports an object model, and any programming environment that supports an object model may be configured to use the techniques described herein. The subject matter herein is not limited to any particular programming language. Thus, in one example, a programmer writes a program in a language such as Java or C#, and includes, as part of that program, instructions to create data object 102 and to set property 106 on data object 102. The instructions to create the object and set the property may be, in effect, the same instructions that would be issued to create a local property in the applicable programming language.

The program in which data object 102 is created may also include instructions to register data object 102 as a shared object. The subject matter herein allows an object to remain purely local, but also allows object to be shared. Thus, if a programmer wants to make an object a shared object, the programmer may issue an instruction to register the object as part of a shared object model 108. In order to implement the sharing of objects, machine 104 may have shared object runtime 110 that negotiates the registration of objects in the shared object model, and the synchronization of objects across machines. (It is noted that FIG. 1 shows an object being shared among machines; however the techniques described herein may also be used to allow plural programs on the same machine to share objects.) Thus, the registration instruction is processed by shared object runtime 110, which performs the appropriate actions to register object 102 as part of shared object model 108. A programmer may register an object with various controls. Examples of such controls are access controls that govern which machines and/or programs may use the shared object (or a particular property of the shared object), and concurrency controls that govern how many machines and/or programs may update the shared object (or a particular property of the shared object) at the same time. Or, an object may be registered without such controls, thereby making the object accessible to any program and/or machine that shares a namespace with machine 104. (Access and concurrency controls are more particularly described below.)

Shared object model 108 may be administered by server 112. Server 112 may administer several object models, although, for simplicity, only object model 108 is shown in FIG. 1. Server 112 maintains the "truth" of an object model— i.e., the correct information about what objects currently exist, and what their properties are. In the example of FIG. 1, the truth of object model 108 indicates that object model 108 contains a plurality of data objects 114 (where the set of data objects 114 includes data object 102). Additionally, properties are set on each of these data objects (such as property 106, which is set on data object 102).

In order for different machines and/or programs to share access to an object, the machines and/or programs share a common namespace. That is, for all of the entities that will access shared object, the same name refers to the same object. For example, namespace 116 may contain names 118, 120, and 122. If machines 124, 126, and 128 are to share access to object 102 that was created on machine 104, then the name of that object (e.g., name 118) will have the same meaning on all of machines 104, 124, 126, and 128. So, if an object has the name "ABCDE", this name refers to the same shared object regardless of whether the object is being accessed from machine 104, machine 124, and so forth.

The components shown in FIG. 1 may be used in the following manner. A program on machine 104 creates an object 102, sets a property 106, and registers object 102 as part of a shared object model. The program may also set concurrency and/or access controls on object 102 and/or on property 106. A copy of the registered object is then stored by server 112. The copy stored by server 112 represents the "truth" of the object, in the sense that differences between what the server copy says about the object and what a local copy says about the object may be resolved in favor of the server copy.

The server then propagates the truth of the object to machines other than machine 104—e.g., to machines 124-128. These other machines may store local copies of the object. If a change to the object is made on any machine (e.g., by changing an existing property on the object, setting a new property, deleting the object, etc.), the shared object runtime on that machine notifies server 112. (Each machine may have a version of shared object runtime 110, which notifies server 112 of changes to objects that arise on that machine. Shared object runtime 110 may also changes the local copy of objects on that machine when server 112 notifies that machine that state changes to the object have arisen on other machines.) Server 112 then adjusts the truth of the object to reflect the change that was made. If two machines make changes to the object at the same time, conflict resolution rules may be used to resolve inconsistent changes to the object. Once the truth of the object is determined by server 112, the machines are notified of updates to the object's state. If access controls have been set on the object, then the current state of the object is provided only to machines that are allowed to access the object. Otherwise, the current state of the object is provided to all machines in the same namespace. Similarly access control rules might be used to reject any updates from clients that don't have permissions to write to the object, to delete the object, etc.

When machines receive notification that the truth of an object has changes, the shared object runtime on each machine updates the machine's local copy of the object to reflect the truth of the object.

A shared object may be created and/or accessed in much the same manner as a local object. The object server and the various machines' shared object runtimes manage the sharing and synchronization of objects by monitoring and updating a machine's local copy of the objects. Therefore, the local copy can be accessed by a program in much the same manner as if the local copy were not being shared and/or synchronized with other machines. Thus, even though a shared object runtime may determine that an object has been changed and may send, to the shared object server, notification of the fact that the object has been changed, the program may continue to manipulate the data without regard to these actions by the shared object runtime. In effect, by using a system built in accordance with the subject matter herein, a program can use shared data as simply as it can use purely local data.

Figure 2:
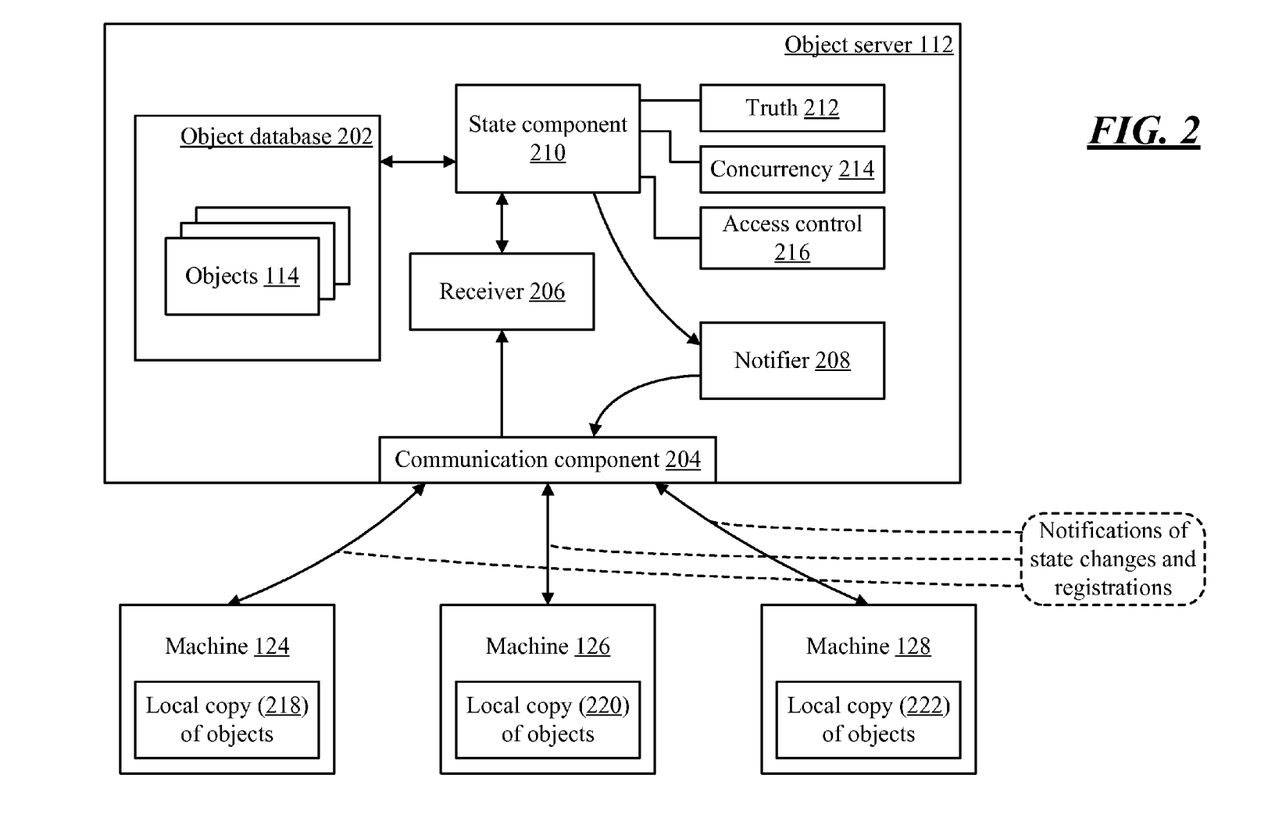
FIG. 2 is a block diagram of detail of an example object server.

FIG. 2 shows detail of an example object server 112. Although object server 112 may take various configurations, in the example shown object server 112 comprises object database 202, communication component 204, receiver 206, notifier 208, and state component 210.

Communication component 204 connects object server 112 to various machines 124, 126, and 128. For example, communication component 204 may comprise hardware and/or software (e.g., a network card and its driver), which allow server 112 to communicate with the world outside of server 112. Server 112 uses communication component 204 to send, to machines 124-128, notifications of state changes to objects 114. Additionally, server 112 uses communication component 204 to receive, from machines 124-128, notifications of change to objects that have occurred on those machines.

When a change to an object arises on a machine (e.g., machine 124), the shared object runtime on that machine generates a notification to server 112. That notification is received by communication component 204, and then passed to receiver 206. Receiver 206 provides the notification of the change to state component 210. State component 210 maintains the truth 212 of objects 114. State component 210 determines whether the truth 212 of the objects is to be changed based on the notifications. For example, if an object is changed on machine 124 (e.g., by changing a property from one value to another) and server 112 is notified of the change, state component 210 may determine that the truth of that object has changed. State component 210 thus makes that change to the truth of the object by making the appropriate update to the object in object database 202. State component 210 may also implement rules to resolve conflicts. For example, if two machines attempt to change the same object at the same time, then state component 210 may determine which one of the changes is to be carried out. Or, if both of the changes are to be carried out, state component 210 may determine how the changes are to be combined to produce the new truth of the object.

Additionally, state component 210 may manage issues relating to concurrency 214 and/or access control 216. Concurrency 214 determines how many entities may access an object (or a property of an object) at the same time. Access control 216 specifies limitations (if any) on which entities (machines or programs) may access a given object, or a property of a given object. Concurrency and access controls for an object and/or property may be specified at the time that the object is registered as a shared object. (In one example, an object and/or property may be made public by default, unless an access control is specified for that object.) Concurrency 214 may be specified with a time limit—e.g., a concurrency control may specify that a particular entity may claim sole write access to an object only for a limited amount of time, and that the sole access constraint ceases to be in effect after the expiration of that amount of time.

When the truth of an object changes, notifier 208 may generate a notification that is sent to the machines that share access to the object. Notifier 208 may send such messages using communication component 204. For example, if state component 210 determines that truth 212 of an object has changed, then notifier 208 may send notifications out to machines 124, 126, and 128. Those machines may maintain local copies 218, 220, and 222, respectively, of the objects to which they share access. In response to notification, the machines may update their local copies 218-222 accordingly.

Figure 3:
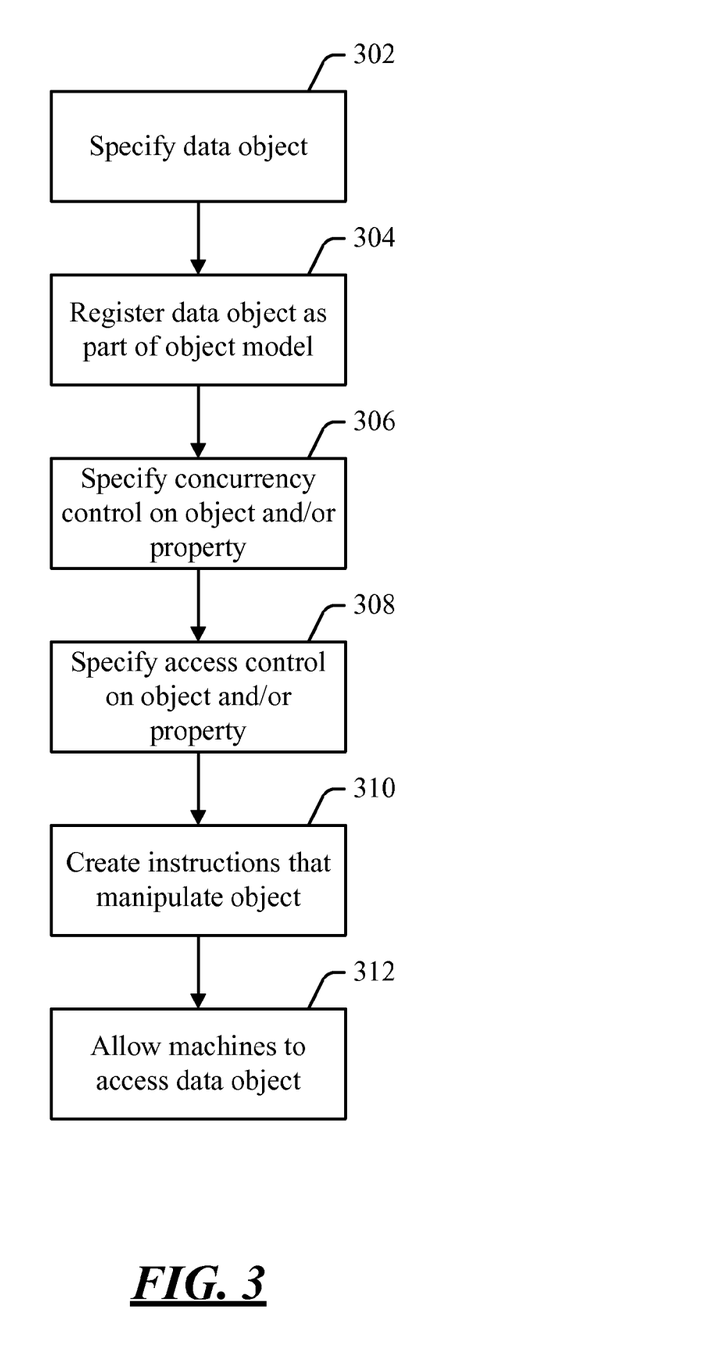
FIG. 3 is a flow diagram of an example process in which a machine may create and use a shared data object.
Figure 4:
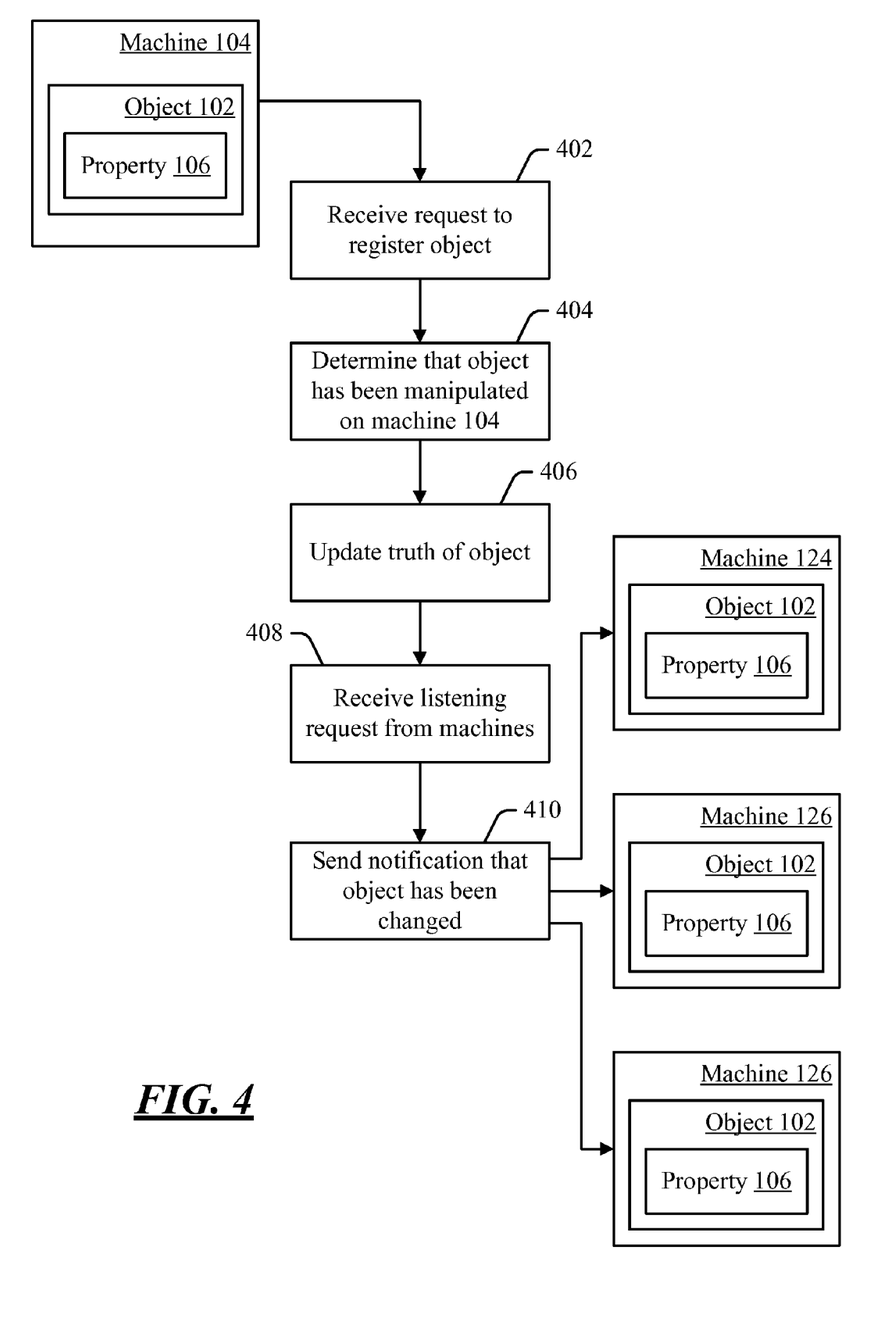
FIG. 4 is a flow diagram of example actions that may be carried out by a shared object server to facilitate the sharing of objects.

FIG. 3 shows an example process in which a machine may create and use a shared data object. Before turning to a description of FIG. 3, it is noted that the flow diagrams contained herein (both in FIG. 3 and in FIG. 4) are described, by way of example, with reference to components shown in FIGS. 1 and 2, although these processes may be carried out in any system and are not limited to the scenarios shown in FIGS. 1 and 2. Additionally, each of the flow diagrams in FIGS. 3 and 4 shows an example in which stages of a process are carried out in a particular order, as indicated by the lines connecting the blocks, but the various stages shown in these diagrams can be performed in any order, or in any combination or sub-combination.

At 302, a data object is specified. The specification of the data object may be performed as part of the instructions in a program. For example, if a programming language provides a mechanism for the programmer to create a data object and to set properties on that object, then the data object may be specified using that mechanism. The mechanism that is used may be the same one that is used to specify local objects.

At 304, the data object may be registered as part of an object model. For example, there may be a local shared object runtime, as described above, which may provide a programming interface that allows the programmer to issue an instruction to register an object as part of a shared object model. Such an instruction may be given at 304.

At 306, a concurrency control may be specified on an object, or on a property of an object. The concurrency control may specify, for example, that only a single entity may write to a given object (or a given property of an object) at one time. Or, in greater generality, the concurrency control may specify how many entities may access a given object at one time. At 308, an access control may be specified on an object, or on a property of an object. The access control may specify which entities may (or may not) access an object.

At 310, instructions may be created that manipulate the object. Manipulation of the object includes any change to an object—e.g., creating the object, deleting the object, adding, deleting, or changing properties on the object, etc. These instructions may be given through the programming language in which the program that uses the object is written. In one example, the instructions are the same instructions that would be used to manipulate a local object.

The process described in FIG. 3 may be performed on one machine. However, as part of that process, at 312, other machines (which may be distinct from the machine on which the process of FIG. 3 is being performed) may be allowed to access the object. For example, a shared object runtime on that machine may cause the object (and any changes to the object) to be transmitted to a shared object server. The server may then settle on a truth of the object, and may notify other machines of changes to the truth of the object, as described above. The use of a shared object server is one implementation of shared objects. However, there are also peer-to-peer implementations, which are encompassed by the subject matter herein.

It is noted that the act of allowing other machines to access an object created by a program may take place without that program having to implement any of the sharing instructions. As noted above, sharing of data across machines generally involves mechanisms to monitor data for changes, transmit the changes to other machines, receive changes from other machines, etc. However, these mechanisms may be implemented by a shared object runtime. Thus, from the perspective of the program that creates a shared object, the program may treat the object as if it were a local object, and the program itself might not contain any particular code that implements the mechanisms to share the object. In one example, the program can share the object simply by issuing the instruction to register the object as part of a shared object model, and the program may otherwise treat the shared object as if it were a local object. That is, the program may be able to share the object without containing any instructions relating to the sharing of the object (other than the initial instruction to register the object as a shared object). Additionally, while the schema of the object is meaningful to the clients, the server can be agnostic to the data an object contains.

FIG. 4 shows example actions that may be carried out by a shared object server to facilitate the sharing of objects.

At 402, the server receives a request to register an object. This request may come, for example, from machine 104, on which data object 102 having property 106 has been created.

At 404, the server may determine that the object has been manipulated on machine 104. For example, the shared object runtime on machine 104 may monitor the local copies of objects on that machine. When an object is manipulated in some manner, the shared object runtime may send the server a notification that the object has been manipulated. This notification may be received by the server.

When the notification is received by the server, the server may determine to update the truth of the object to reflect the locally-made change of which the server has been notified. This update may occur at 406. At some point, machines on which shared use of the object is being made may send listening requests to the server, which ask that the server notify those machines of changes to a particular object or set of objects. These listening requests are received at 408. (The receipt of listening requests is shown as occurring between 408 and 410, although the requests to be notified of changes to an object may be received at any point in time; the sequence shown in FIG. 4 is not limiting of the subject matter herein.) Once the truth of the object has been determined, notification that the state of the object has been changed may be sent, at 410, to other machines (e.g., machine 124, 126, and 128) that share access to object 102. These machines may then update their own local copies of object. If an access control is in place for an object (or for a property of the object), then the notification may be sent to those machines on which access to the object (or property) is permitted.

Figure 5:
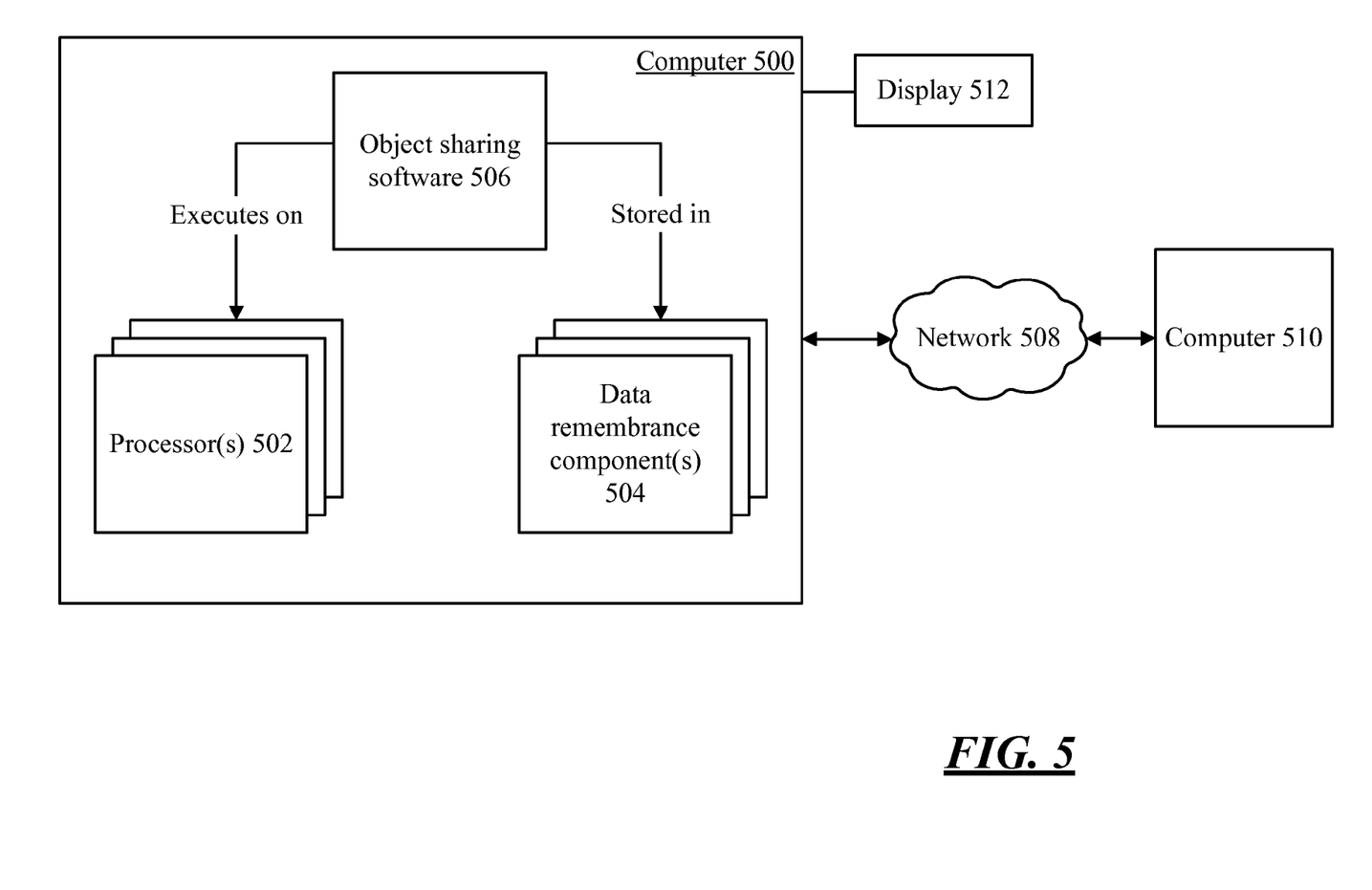
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is object sharing software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of creating a program that executes on a first machine, the method comprising:
    using a processor to perform acts comprising:
        specifying a first data object that comprises a first property;
        registering said first data object as part of an object model, said object model having a name that is part of a namespace shared across said first machine and a plurality of second machines that are distinct from said first machine;
        creating a plurality of instructions that, when executed by said processor, cause the processor to manipulate said first data object; and
        allowing said plurality of second machines to access said object without implementing, in said program, code that specifies how said program communicates manipulation of said first data object to said plurality of second machines, and without implementing, in said program, code that specifies how manipulations of said first data object on said plurality of second machines are to be received by said program, said program comprising code that manipulates said first data object as if said first data object were data local to said program using the same instructions that would be issued to manipulate data that is local to said program.

2. The method of claim 1, wherein said acts further comprise:
    specifying a concurrency control that governs whether said first data object or said first property can be manipulated by more than one program at a given time.

3. The method of claim 2, wherein said concurrency control governs whether said first property can be manipulated by more than one program at a given time independently of whether said first data object can be manipulated by more than one program at a given time.

4. The method of claim 2, wherein said acts further comprise:
    receiving a time limit on said concurrency control, wherein said concurrency control ceases to be in effect after expiration of said time limit.

5. The method of claim 1, wherein properties in said first data object can be made sharable or not sharable, and wherein said acts further comprise:
    specifying whether said first property is to be made sharable or not sharable.

6. The method of claim 1, further comprising:
    manipulating or using a second data object that is part of said object model and that was created on one of said plurality of second machines.

7. A system for sharing data objects across a plurality of machines, the system comprising:
    a processor;
    a data remembrance component;
    an object database that stores, in said data remembrance component, said data objects and properties of said data objects;
    a communications component that communicatively connects said system to a plurality of machines on which data objects are manipulated or used;
    a receiver component that executes on said processor and that receives, from said plurality of machines, indications of when and how said data objects have been manipulated on said plurality of machines;
    a state component that executes on said processor and that updates a state of said data objects and said properties of said data objects in said database when said receiver component receives said indications; and
    a notification component that executes on said processor and that notifies said plurality of machines when said state of said data objects and said properties of said data objects have changed, a program that executes on said processor manipulating said data objects without regard to whether said plurality machines have been notified, or will be notified, of manipulation of said data objects, said program comprising code that manipulates data objects as if said data objects were data local to said program using the same instructions that would be issued to manipulate data that is local to said program.

8. The system of claim 7, wherein said receiver component receives a concurrency control on a first one of said data objects or on a property of said first one of said data objects, and wherein said system determines how many of said plurality of machines can access said first one of said data objects, or a property of said first one of said data objects, concurrently.

9. The system of claim 8, wherein said concurrency control specifies how many of said plurality of machines can access said property concurrently independently of how many of said plurality of machines can access said first one of said data objects.

10. The system of claim 8, wherein said receiver component receives a time limit on said concurrency control, wherein said concurrency control ceases to be in effect after expiration of said time limit.

11. The system of claim 7, wherein said indications received by said receiver component indicate that a first one of said data objects has been added, modified, or deleted on a first one of said plurality of machines, and wherein said state component, in response to said indications, updates said state of said data objects to reflect adding, modifying, or deleting of said first one of said data objects.

12. The system of claim 7, wherein, in response to a change of said state of said data objects to indicate that a first one of said data objects has been added, modified, or deleted on a first one of said plurality of machines, said notification component notifies a second one of said plurality of machines, which is distinct from said first one of said plurality of machines, that said first one of said data objects has been added, modified, or deleted.

13. The system of claim 7, wherein said system notifies said plurality of machines of changes to said data objects without regard to content or type of said data objects.

14. One or more computer-readable storage devices that store executable instructions to share objects, wherein the executable instructions, when executed by a first machine, cause the first machine to perform acts comprising:
receiving a request to register a first object that comprises a first property, said first object being part of an object model having a name that is part of a name space shared across said first machine and a plurality of second machines that are distinct from said first machine;
determining that said first object has been manipulated by a first program on said first machine;
sending, to said plurality of second machines, a first notification that said first object has been manipulated on said first machine, wherein said first program manipulates said first object without regard to whether said determining and said sending have occurred or will occur, said first program comprising code that manipulates said first object as if said first object were data local to said program using the same instructions that would be issued to manipulate data that is local to said program;
receiving, from said plurality of second machines, a second notification that said first object has been manipulated on one of said plurality of second machines; and
changing said first object on said first machine in accordance with said second notification.

15. The one or more computer-readable storage devices of claim 14, wherein said acts further comprise:
specifying a concurrency control that governs whether said first object or said first property can be manipulated by more than one program at a given time.

16. The one or more computer-readable storage devices of claim 15, wherein said concurrency control governs whether said first property can be manipulated by more than one program at a given time independently of whether said first object can be manipulated by more than one program at a given time.

17. The one or more computer-readable storage devices of claim 15, wherein said acts further comprise:
receiving a time limit on said concurrency control, wherein said concurrency control ceases to be in effect after expiration of said time limit.

18. The one or more computer-readable storage devices of claim 14, wherein properties in said first object can be made sharable or not sharable, and wherein said acts further comprise:
specifying whether said first property is to be made sharable or not sharable.

19. The one or more computer-readable storage devices of claim 14, wherein said first machine performs said acts without regard to a type of said first object.

20. The one or more computer-readable storage devices of claim 14, wherein said sending to said plurality of second machines comprises sending said first notification to a server that sends said first notification to said plurality of second machines.

\* \* \* \* \*